United States Patent
Yamashita

(10) Patent No.: US 8,468,467 B2
(45) Date of Patent: Jun. 18, 2013

(54) DISPLAY CONTROL APPARATUS, DISPLAY CONTROL METHOD AND PROGRAM FOR DISPLAYING IMAGES OF A PLURALITY OF FILES

(75) Inventor: Tomoya Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 566 days.

(21) Appl. No.: 12/370,238

(22) Filed: Feb. 12, 2009

(65) Prior Publication Data

US 2009/0217204 A1 Aug. 27, 2009

(30) Foreign Application Priority Data

Feb. 27, 2008 (JP) .................................. 2008-046899

(51) Int. Cl.
*G06F 3/048* (2006.01)

(52) U.S. Cl.
USPC .......................... 715/838; 715/767; 715/794

(58) Field of Classification Search
USPC ................. 715/212, 243, 712–713, 717–718, 715/764, 781, 803, 810, 825, 836, 838–839, 715/848, 850, 866, 767, 794
See application file for complete search history.

(56) References Cited

U.S. PATENT DOCUMENTS

| | | | |
|---|---|---|---|
| 5,745,161 A | 4/1998 | Ito | |
| 6,411,724 B1* | 6/2002 | Vaithilingam et al. | 382/100 |
| 6,943,842 B2* | 9/2005 | Stavely et al. | 348/333.05 |
| 7,148,919 B2* | 12/2006 | Voss et al. | 348/220.1 |
| 7,308,443 B1* | 12/2007 | Lee et al. | 1/1 |
| 7,689,525 B2* | 3/2010 | Drucker et al. | 706/45 |
| 7,730,426 B2* | 6/2010 | Slawson et al. | 715/835 |
| 8,090,712 B2* | 1/2012 | Shellshear | 707/723 |
| 8,185,839 B2* | 5/2012 | Jalon et al. | 715/769 |
| 8,250,490 B2* | 8/2012 | Fujiwara et al. | 715/851 |
| 2001/0015721 A1* | 8/2001 | Byun et al. | 345/169 |
| 2005/0052338 A1* | 3/2005 | Suzuki et al. | 345/1.1 |
| 2005/0210410 A1* | 9/2005 | Ohwa et al. | 715/821 |
| 2005/0257166 A1* | 11/2005 | Tu | 715/787 |
| 2006/0112092 A1* | 5/2006 | Ziou et al. | 707/5 |
| 2006/0236251 A1* | 10/2006 | Kataoka et al. | 715/757 |
| 2006/0268126 A1* | 11/2006 | Ishibashi et al. | 348/231.99 |
| 2007/0136687 A1* | 6/2007 | Pak | 715/811 |
| 2007/0266411 A1 | 11/2007 | Yamamoto et al. | |

(Continued)

FOREIGN PATENT DOCUMENTS

| | | |
|---|---|---|
| JP | 2002-010196 | 1/2002 |
| JP | 2004-282785 | 10/2004 |
| JP | 3871684 | 1/2007 |
| JP | 2008-041155 | 2/2008 |

*Primary Examiner* — Steven Sax
*Assistant Examiner* — Wilson Varga
(74) *Attorney, Agent, or Firm* — Cowan, Liebowitz & Latman, P.C.

(57) ABSTRACT

A display control apparatus for displaying images of a plurality of files as a list on a display unit, comprises: a setup unit which sets a specific file type among a plurality of file types as a reference file type; a reference file retrieval unit which retrieves a file of the type set among the plurality of files as the reference file; an associated file retrieval unit which retrieves an associated file from among the plurality of files; and a control unit which controls the display unit such that a list of the images of a plurality of reference files arranged in a first direction and the images of the associated files arranged in a second direction intersecting with the first direction at the location of the image of each reference file.

16 Claims, 16 Drawing Sheets

U.S. PATENT DOCUMENTS

| | | |
|---|---|---|
| 2007/0270985 A1 | 11/2007 | Shellshear |
| 2008/0030488 A1* | 2/2008 | Kobayashi .................... 345/204 |
| 2008/0155192 A1* | 6/2008 | Iitsuka ......................... 711/114 |
| 2009/0007018 A1* | 1/2009 | Ikeda et al. ................... 715/838 |
| 2009/0177962 A1* | 7/2009 | Gusmorino et al. .......... 715/243 |

* cited by examiner

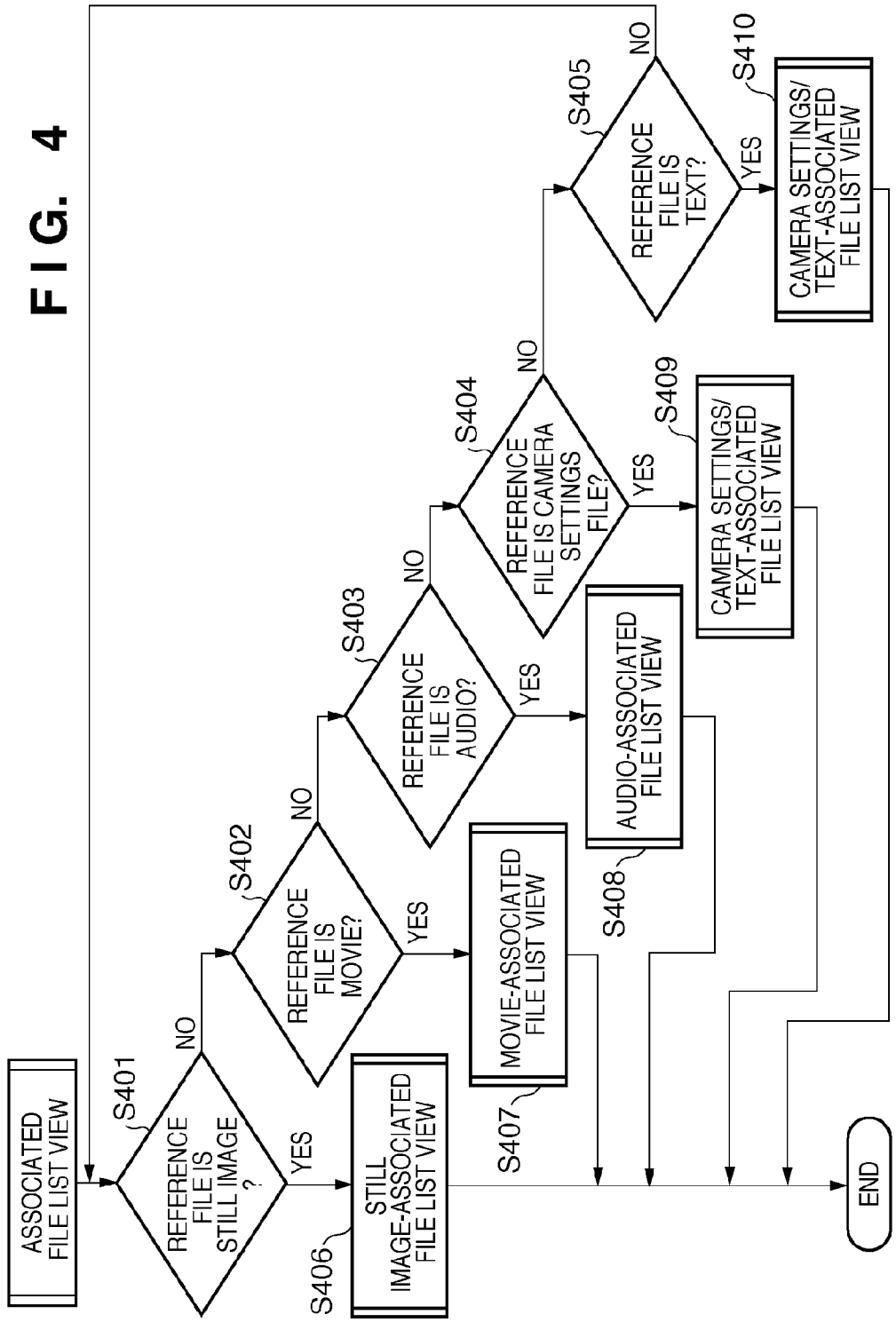

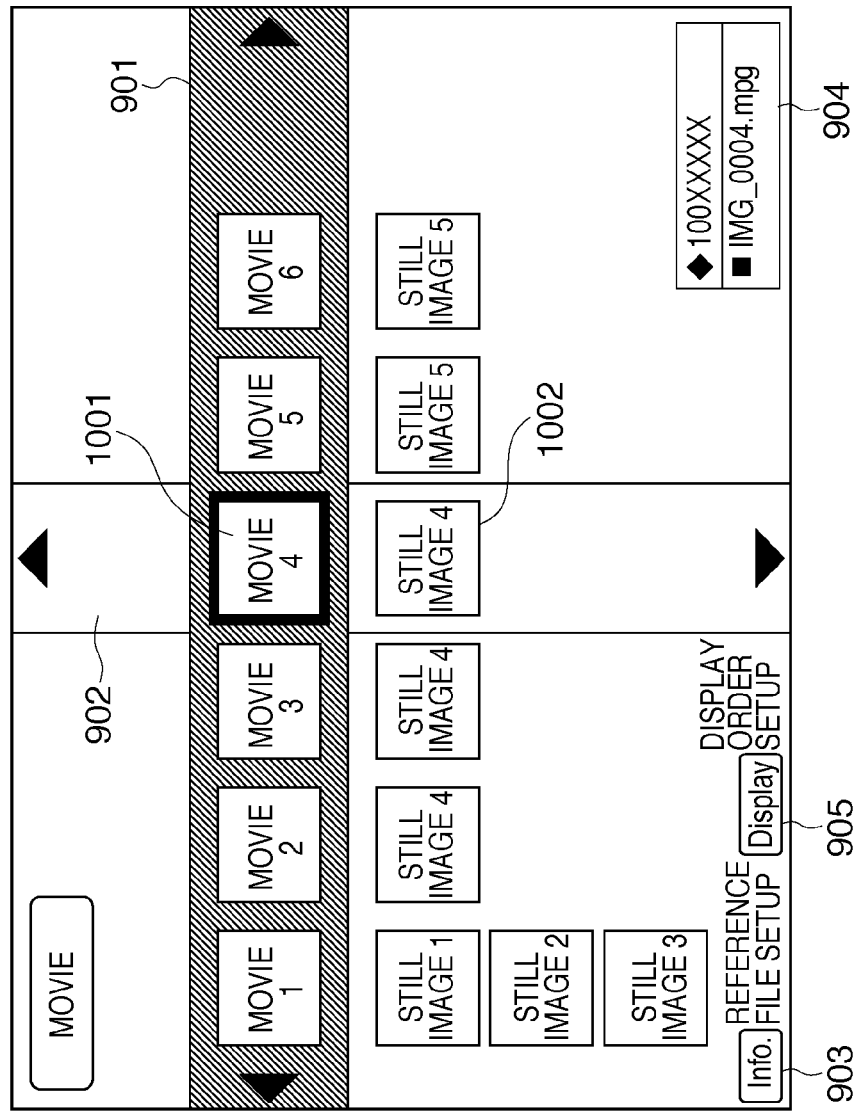

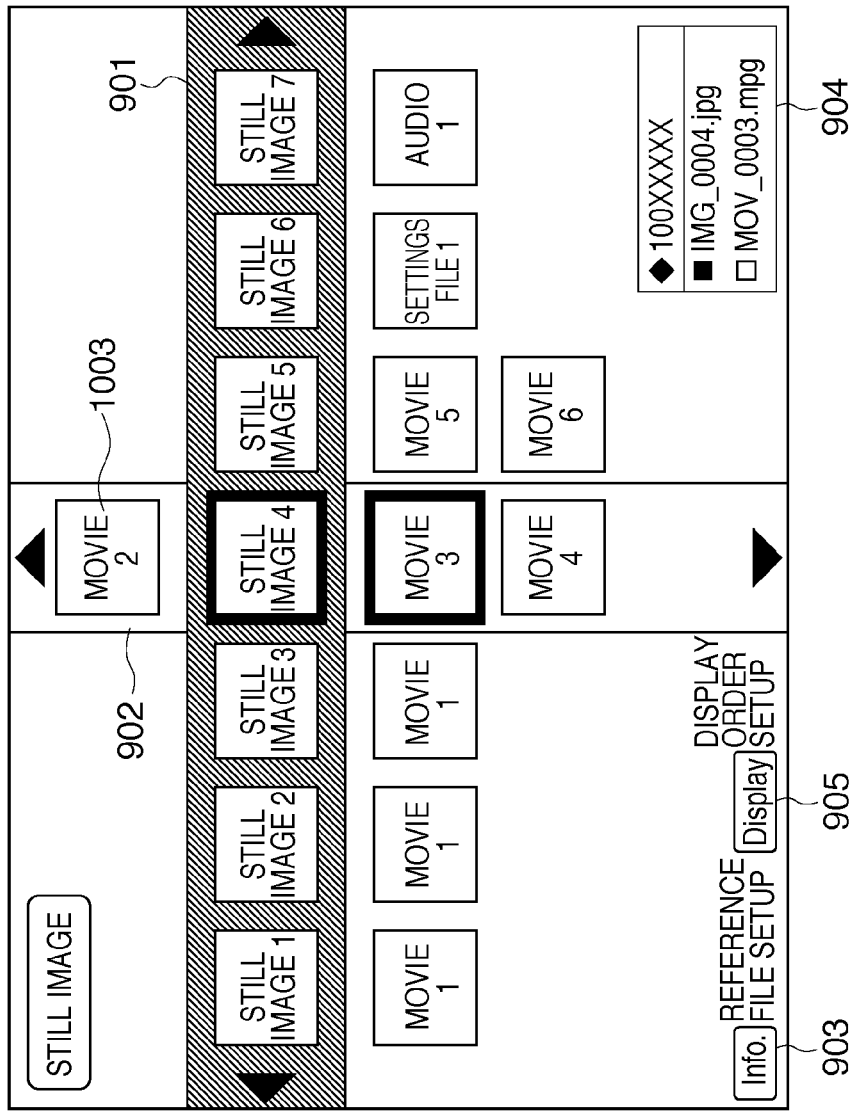

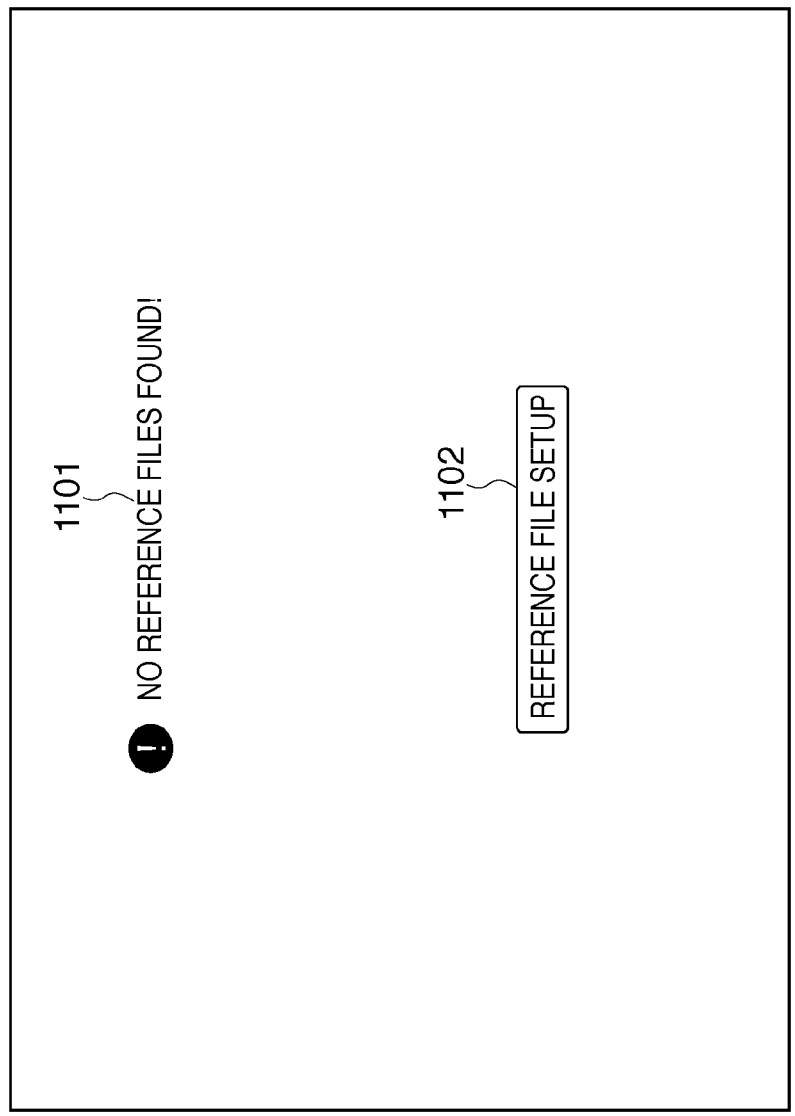

DISPLAY CONTROL APPARATUS, DISPLAY CONTROL METHOD AND PROGRAM FOR DISPLAYING IMAGES OF A PLURALITY OF FILES

BACKGROUND OF THE INVENTION

1. Field of the Invention

The present invention relates to a technology for displaying multiple files on a display unit.

2. Description of the Related Art

Recently, cameras have become capable of handling, on their own, various types of recording formats used in movie, still image, and audio files. Moreover, with the increase in resolution and size of display devices, recent display devices have become capable of displaying large numbers of various files at a high level of definition and in keeping with the above-mentioned diversification of file formats. Japanese Patent Laid-Open No. 2004-282785 describes a technology used for displaying, on a monitor, a list of movies or still images received from different participants in a multi-user videoconference system.

However, in Japanese Patent Laid-Open No. 2004-282785 above, on the monitor, one could only see movies corresponding to one still image selected from a list of still images while movies corresponding to other still images that were not selected could not be examined. Accordingly, the user had to re-select other still images when checking movies corresponding to other still images. For this reason, with a large number of files, checking associations between the files was a burdensome task.

SUMMARY OF THE INVENTION

In order to solve the aforementioned problems, the present invention provides a display control apparatus for displaying images of a plurality of files as a list on a display unit, the apparatus comprising: a setup unit adapted to set a specific file type among a plurality of file types as a reference file type; a reference file retrieval unit adapted to retrieve a file of the type set by the setup unit from among the plurality of files as the reference file; an associated file retrieval unit adapted to retrieve, from among the plurality of files, an associated file having a predetermined association with the reference file retrieved by the reference file retrieval unit; and a control unit adapted to control the display unit such that, along with displaying a list of the images of a plurality of reference files retrieved by the reference file retrieval unit arranged in a first direction, the images of the associated files associated with the reference files indicated by the images displayed as a list, are displayed as a list arranged in a second direction intersecting with the arrangement oriented in the first direction at the location of the image of each reference file.

The present invention also provides an imaging apparatus having an image sensing unit and displaying images of a plurality of files containing at least image files of images captured by the image sensing unit as a list on a display unit, the apparatus comprising: a setup unit adapted to set a specific file type among a plurality of file types as a reference file type; a reference file retrieval unit adapted to retrieve a file of the type set by the setup unit from among the plurality of files as the reference file; an associated file retrieval unit adapted to retrieve, from among the plurality of files, an associated file having a predetermined association with the reference file retrieved by the retrieval unit; and a control unit adapted to control the display unit such that, along with displaying a list of the images of a plurality of reference files retrieved by the reference file retrieval unit arranged in a first direction, the images of the associated files associated with the reference files indicated by the images displayed as a list, are displayed as a list arranged in a second direction intersecting with the arrangement oriented in the first direction at the location of the image of each reference file.

The present invention also provides a display control method for displaying images of a plurality of files as a list on a display unit, the method comprising the steps of: setting a specific file type among a plurality of file types as a reference file type; retrieving a file of the type set in the setup step from among the plurality of files as the reference file; retrieving, from among the plurality of files, an associated file having a predetermined association with the reference file retrieved in the reference file retrieval step; and controlling the display unit such that, along with displaying a list of the images of a plurality of reference files retrieved in the reference file retrieval step arranged in a first direction, the images of the associated files associated with the reference files indicated by the images displayed as a list, are displayed as a list arranged in a second direction intersecting with the arrangement oriented in the first direction at the location of the image of each reference file.

According to the present invention, it is easy to visually recognize associations between multiple files.

Further features of the present invention will become apparent from the following description of exemplary embodiments (with reference to the attached drawings).

BRIEF DESCRIPTION OF THE DRAWINGS

FIG. 4 is a flow chart illustrating associated file list view control in the first embodiment.

FIG. 10A is a diagram illustrating a file list view screen displayed when the type of the reference file is changed from "still image file" to "movie file".

FIG. 10B is a diagram illustrating a screen displayed when an operation of forward scrolling of associated files is executed in the state depicted in FIG. 9.

DESCRIPTION OF THE EMBODIMENTS

Below, the best mode for carrying out the present invention is explained in detail with reference to the accompanying drawings.

It should be noted that the embodiments explained below are merely examples intended to reduce the present invention to practice, which should be appropriately corrected or modified depending on various conditions and device configurations, to which the present invention is applied, and the present invention is not limited to the embodiments below.

[Embodiment 1]

Figure 1:
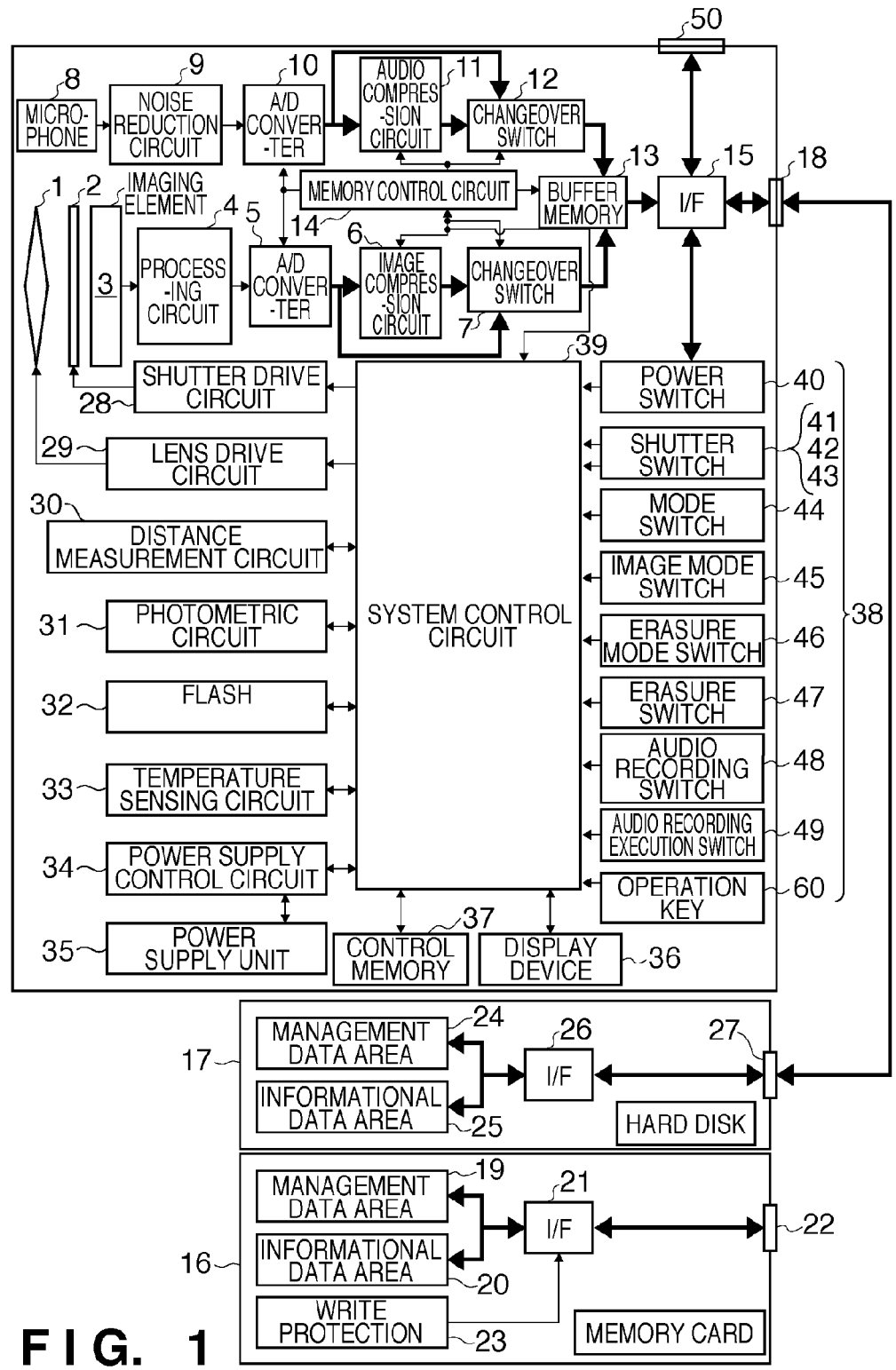
FIG. 1 is a block diagram illustrating a camera configuration used in a first embodiment.

FIG. 1 is a block diagram illustrating the electrical configuration of an electronic still camera (referred to as "camera" below) used in a first embodiment of the present invention.

In FIG. 1, the reference numeral 1 designates a taking lens. The reference numeral 2 represents a shutter provided with diaphragm functionality. The reference numeral 3 denotes an imaging element, which converts optical images into electrical signals with the help of a CCD, etc. The reference numeral 4 indicates a processing circuit, which performs gamma correction and other well-known camera signal processing operations. The reference numeral 5 represents an A/D converter, which converts the analog output of the processing circuit 4 into digital signals. The reference numeral 6 designates an image compression circuit, which performs image data compression using an adaptive discrete cosine transform (ADCT), etc. The reference numeral 7 represents a changeover switch used for switching between transmission of image data produced by compression using the above-mentioned image compression circuit 6 and image data produced as a result of bypassing the image compression circuit 6 (uncompressed).

The reference numeral 8 denotes a microphone for external audio input. The reference numeral 9 represents a noise reduction circuit used for reducing noise in the audio signal output from the above-mentioned microphone 8. The reference numeral 10 designates an A/D converter, which converts the analog output of the above-mentioned noise reduction circuit 9 into digital signals. The reference numeral 11 represents an audio compression circuit, which performs data compression using adaptive differential PCM (DPCM) or the like. The reference numeral 12 identifies a changeover switch used for switching between transmission of audio data produced by compression using the audio compression circuit 11 and audio data produced as a result of bypassing the audio compression circuit 11.

The reference numeral 13 represents a buffer memory. The above-mentioned buffer memory 13 is a memory capable of temporarily storing image data (video signals) and audio data (audio signals) and reading out the above-mentioned signals at the desired speed with the help of a memory control circuit 14, which is described below.

The reference numeral 14 designates a memory control circuit, which controls the A/D converters 5 and 10, image compression circuit 6, audio compression circuit 11, changeover switches 7 and 12, and buffer memory 13. When image data is compressed, the compression circuit 6 writes compressed image data, and when it is not compressed, writes image data outputted from the A/D converter 5 to the buffer memory 13 under the control of the memory control circuit 14. When the audio data is compressed, the compression circuit 11 writes compressed audio data, and when it is not compressed, writes audio data outputted from the A/D converter 10 to the buffer memory 13 under the control of the memory control circuit 14.

The reference numeral 15 represents an interface (I/F) with a memory card 16, a hard disk 17 or an external device. The reference numeral 18 indicates a connector located on the main body of the camera, the connector providing electrical connection between the main body of the camera and the memory card 16 or hard disk 17.

A management data area 19 and information data area 20 are provided in the recording area of the memory card 16. Information stored here is externally read out/written via a connector 22 and an interface 21 on the memory card. Moreover, information contained in a write-protected area (write-protected area), 23, can be externally read out via the connector 22 and interface 21. The above-mentioned interface 21, which is composed of a CPU, MPU or other control circuitry, a ROM, EEPROM, or other nonvolatile memory, and a RAM, etc., exercises control over the memory card 16 based on a predetermined program.

On the other hand, a management data area 24 and information data area 25 are provided in the recording area of the hard disk 17. Information stored here is externally read out/written via a connector 27 and an interface 26. The above-mentioned interface 26, which is composed of a CPU, MPU or other control circuitry, a ROM, EEPROM, or other nonvolatile memory, and a RAM, etc., exercises control over the hard disk 17 based on a predetermined program.

The reference numeral 28 represents a shutter drive circuit, which drives the shutter 2. The reference numeral 29 designates a lens drive circuit, which drives a focusing lens inside the taking lens 1. The reference numeral 30 represents a distance measurement circuit, which measures distances to objects. The reference numeral 31 indicates a photometric circuit, which measures the brightness of objects. The reference numeral 32 represents a flash. The reference numeral 33 designates a temperature sensing circuit, which senses the temperature of the recording media, as well as the presence of frost or dew.

The reference numeral 34 represents a power supply control circuit, which effects power supply status detection and control, and the reference numeral 35 indicates a power supply unit, which is made up of a battery, a DC-DC converter, and switches used for switching between blocks to be supplied with electric power and is controlled by the above-mentioned power supply control circuit 34.

Moreover, the power supply control circuit 34, which detects the presence or absence of a battery, the type of the battery, and the remaining battery capacity, controls the power supply unit 35 based on the detection results and commands from a system control circuit 39, which is described below.

The reference numeral 36 represents a display device provided with a display unit displaying various information regarding the camera, captured images, menu items, etc., and the reference numeral 37 designates a control memory used for storing constant values, variables and the like required for imaging by the system control circuit 39, which is described below.

The reference numeral 38 is a group of switches used for the entry of various operating instructions addressed to the system control circuit 39, which is described below. The switch group 38 includes, for instance, a power switch 40 and a distance measurement/photometry switch 42, which is closed by a first stroke of a shutter switch 41 and issues instructions regarding distance measurement and photometry with the help of the distance measurement circuit 30 and photometric circuit 31. Moreover, the switch group 38 includes a recording switch 43, which is closed by a second stroke of the shutter switch 41 and issues instructions regarding the recording of captured images on the memory card 16 or hard disk 17. Moreover, the switch group 38 includes a mode switch 44, which selects between a self-timer imaging mode and, on the other hand, a single (S) mode involving capture of a single image or single group of images and a continuous (C) mode involving capture of multiple images or multiple groups of images in a continuous manner. Furthermore, the switch group 38 includes an image mode switch 45 (which is shown as a single unit in the figure, but is made up of several switches), which selects the manner in which images are captured, that is, their compression ratios, compression schemes, pixel structure, aspect ratios, frame recording/field recording, the number of images captured, etc. Furthermore, the switch group 38 includes an erasure mode switch 46, which is used for selecting an erasure mode, an erasure switch 47, which is used for issuing instructions to execute erasure, an audio recording switch 48, which is used for specifying whether or not audio recording should be turned "on" and "off", and an audio recording execution switch 49, which is used for issuing instructions to record audio. Moreover, the switch group 38 includes an operation key 60. A "cross" key having keys arranged in the vertical and horizontal direction, or a touch wheel, etc. can be used as the operation key 60.

The reference numeral 39 is a system control circuit, which exercises overall control over the camera as a whole based on software programs and signals input to the main body of the camera. For instance, it exercises control involving various operating instructions entered via the switch group 38, detection of the status (remaining storage capacity, etc.) of the recording media and the type of the recording media loaded in the camera main body, as well as other types of control. The system control circuit 39 controls the taking lens 1 to keep it in focus by driving the focusing lens of the taking lens 1 with the help of the lens drive circuit 29 in accordance with the measurement results of the distance measurement circuit 30, for example. Furthermore, the system control circuit 39 exercises control involving determining the exposure time of the shutter 2 using the shutter drive circuit 28 so as to provide an optimum amount of exposure depending on the photometric results of the photometric circuit 31. The operation of the camera in the flow charts explained below is implemented through the control exercised by the system control circuit 39 over each component based on software and input signals. It should be noted that the hardware used for exercising various types of control is not limited to the arrangement described in the present embodiment. Thus, a single hardware component may control the entire camera, and, alternatively, the functions of the camera may be controlled by distributing various types of processing among multiple hardware components. The reference numeral 50 identifies a connector used for connecting to external devices.

[File List View Control]

Before moving on to the specifics of camera operation, explanations will be provided regarding the file list view screen used in the present embodiment. In the file list view of the present embodiment, reference files and associated files are displayed on a single screen. It should be noted that the items displayed here may be either file thumbnails or icons representing the files.

As used herein, the term "reference file" refers to a file of a certain type designated by user action, etc., which serves as a reference for display on the list view screen. The file types that can be designated include, for instance, still image files, movie files, audio files, and settings files, etc.

The term "associated file" refers to a file associated with a reference file. For instance, if a still image is captured while a movie is being shot, the file of the still image is associated with the file of the movie. Then, if a still image file is designated as a reference file, the file of the movie associated with the still image file becomes an associated file of the still image file. Moreover, if a movie file is designated as a reference file, then the still image file associated with the movie file becomes an associated file of the movie file.

It should be noted that the type of the reference file designated by user action etc. is stored in the control memory 37, etc.

Figure 9:
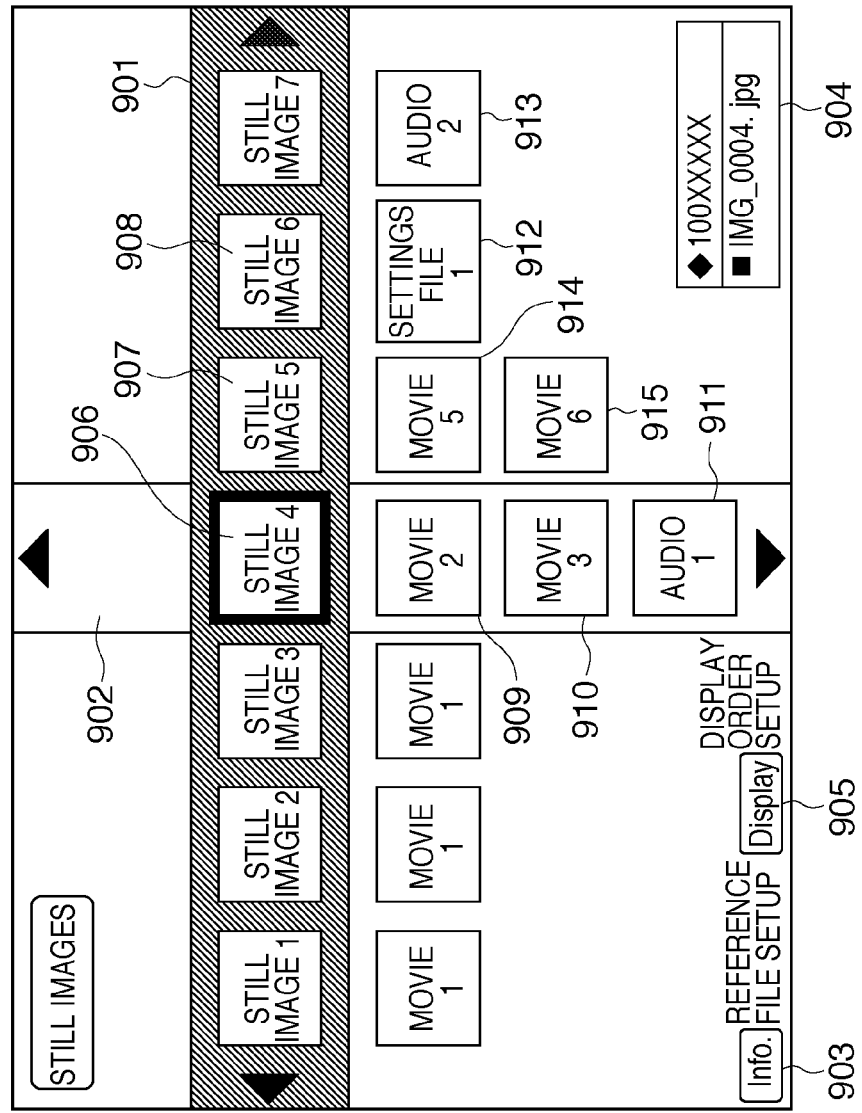
FIG. 9 is a diagram illustrating a file list view screen displayed when the type of the reference file used in the present embodiment is "still image file".

FIG. 9 illustrates an exemplary file list view screen displayed on the display unit of the display device 36 of the camera. In FIG. 9, the top-to-bottom direction, that is, the vertical direction, of the display screen is referred to as the "direction of the Y axis" and the lateral direction, that is, the horizontal direction, of the display screen, is referred to as the "direction of the X axis". The directions of the Y axis and X axis are orthogonal.

In the direction of the X axis, reference files are displayed in a reference file display area 901. In the example of FIG. 9, a still image file, for instance, file 906, is selected and displayed as a reference file. It should be noted that the selected image is displayed using a thick border, etc. so as to permit differentiation from other files, with file information 904, such as the file name, etc., displayed as well.

Associated files are displayed in the direction of the Y axis direction. The files displayed in the example of FIG. 9 include a movie file 909, a settings file 912, an audio file 913, etc., which are associated with the still image file. At such time, the associated files are displayed directly underneath, that is, along the same axis as the reference file, with which they are associated. In the example of FIG. 9, the movie file 909, a movie file 910 and an audio file 911 are associated with the still image file 906 and, for this reason, the movie files 909, 910 and audio file 911 are displayed in a display area 902 directly underneath the still image file 906. Moreover, movie files 914, 915 are associated with a still image file 907 and, therefore, the movie files 914, 915 are displayed directly underneath the still image file 907.

A reference file setting icon, 903, is used for setting up reference files. The reference file setting icon 903 may change the type of the reference file in a predetermined order whenever it is selected or, it may display a selection screen for selecting and setting up the file type when selected.

A display order setting icon 905 is used for setting up the order of display of files on the file list view screen. The display order can be set up for each file type. The display order setting icon 905 may change the display order in a predetermined order whenever it is selected or, it may display a selection screen for selecting the display order when selected. It should be noted that while the display order that can be selected in the present embodiment includes "by file name" and "by the time/date of capture of the image", it is not limited to these types of display order.

Furthermore, FIG. 10A illustrates the file list view screen displayed when the type of the reference file is changed from "still image file" to "movie file". In this case, movie file 1001 and others, which serve as reference files, are displayed in the reference file display area 901 in the direction of the X axis. The associated files of the movie files are displayed in the direction of the Y axis. In other words, in this case, the still image file 1002, etc., become associated files and, therefore, are displayed in the direction of the Y axis.

In this manner, arranging the reference files in a first axial direction and arranging the associated files of the reference files in a second axial direction different from the first direction allows the camera of the present embodiment to display a screen that can be easily read by the user.

Next, the specifics of the display control process used to display the file list view screen, such as the one shown in FIG. 9, will be described in detail with reference to FIG. 2.

Figure 2:
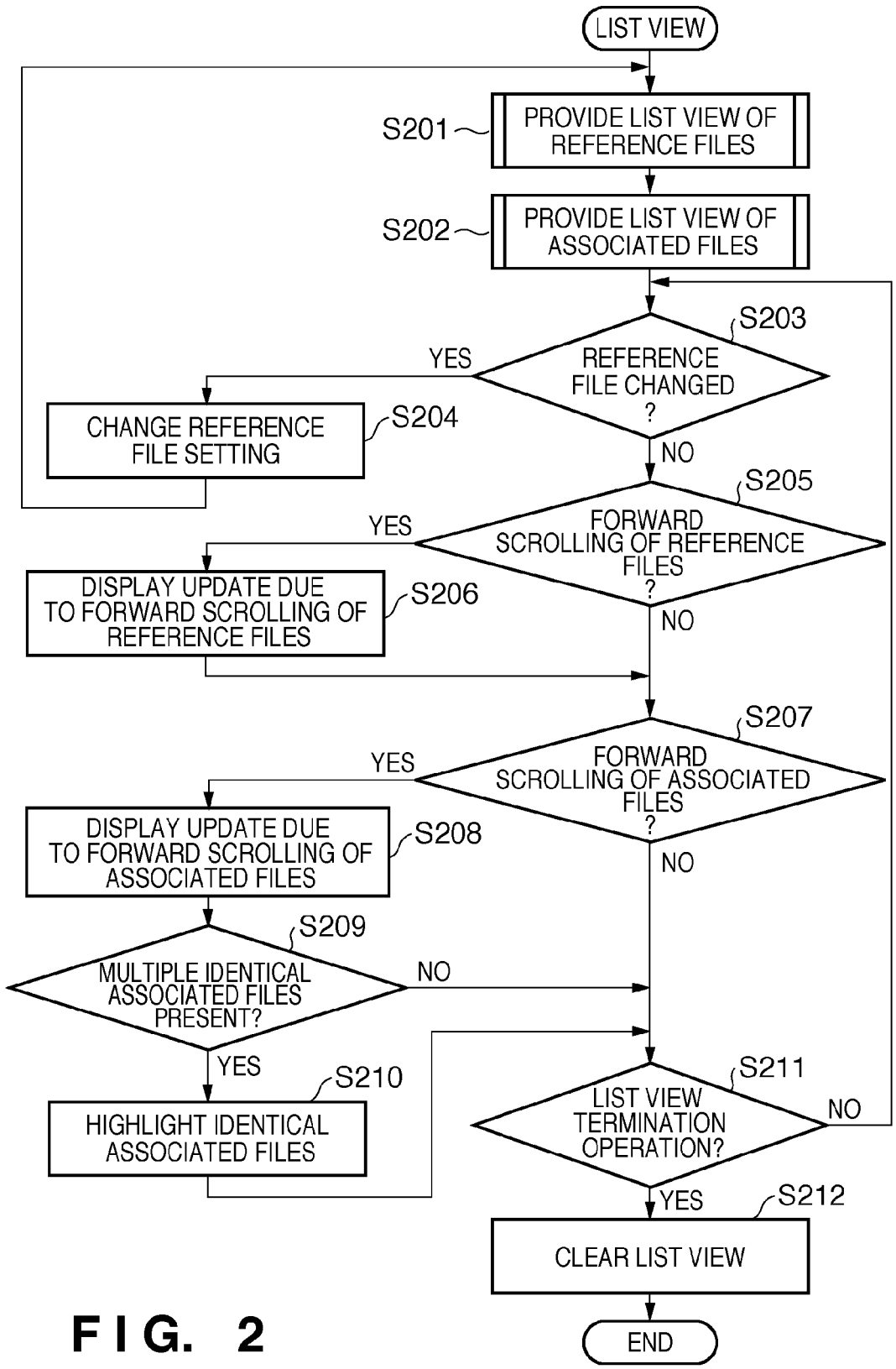
FIG. 2 is a flow chart illustrating overall file list view control in the first embodiment.

FIG. 2 is a flow chart illustrating the overall file list view control of the present embodiment.

First of all, the camera provides a reference file list view based on the designated reference file (S201) and then provides an associated file list view (S202). In the present embodiment, still image files are designated as reference files by default. Once the file list view operation has been executed, a reference file list view is provided based on the reference file selected during a previous view operation. The reference file list view and the associated file list view are described below.

Next, the camera determines whether or not an instruction to change the reference file has been issued (S203). An instruction to change the reference file is issued, for instance, when the user selects the reference file setting icon 903. If it is determined in S203 that an instruction to change the reference file has been issued, the camera changes the reference file setting (S204) and returns the process to S201. It then provides a reference file list view (S201) and an associated file list view (S202) based on the changed reference file.

Next, the camera determines whether or not an operation of forward scrolling of reference files has been carried out (S205). The "operation of forward scrolling of reference files" is an operation, during which, as shown, for instance, in the example of FIG. 9, the selected reference file is sequentially switched from the still image file 906 to the still image file 907, still image file 908, and so on. Moreover, an operation involving switching in the opposite direction is referred to as an "operation of backward scrolling of reference files". In the present embodiment, the operation of forward scrolling of reference files can be carried out when, for instance, the user pushes the right-hand portion of the "cross" key, and the operation of backward scrolling of reference files can be carried out by pressing the left-hand portion thereof.

If it is determined in S205 that an operation of forward scrolling of reference files has been performed, a display update caused by the operation of forward scrolling of reference files is carried out (S206). If it is determined that no operation of forward scrolling of reference files has been performed, the process proceeds towards S211.

Next, it is determined whether or not an operation of forward scrolling of associated files has been carried out (S207). The "operation of forward scrolling of associated files" is an operation, during which selected associated files are sequentially switched in a manner similar to the operation of forward scrolling of reference files. In the present embodiment, an operation of forward scrolling of associated files can be carried out when, for instance, the user pushes the bottom portion of the "cross" key, and an operation of backward scrolling of associated files can be carried out by pushing the top portion thereof. In this manner, a more intuitive operation is made possible by enabling forward image scrolling using the "cross" key, in which the operation members are arranged in a first and second direction.

A screen displayed when an operation of forward scrolling of associated files is carried out in the state depicted in FIG. 9 is illustrated in FIG. 10B. In this case, movie files are shifted, one-by-one, upwards from the state depicted in FIG. 9, with "Movie 2" (1003) moving up so as to be positioned above "Still Image 4" (906). If it is determined in S207 that an operation of forward scrolling of associated files has been carried out, a display update caused by the forward scrolling of associated files is carried out (S208).

If multiple identical associated files are present among the associated files displayed in the list view at such time (S209), the camera highlights the identical associated files (S210), displaying them in a different manner in order to accentuate the presence of multiple files. If in S207 the camera determines that no operation of forward scrolling of associated files has been performed, the process advances to S211.

Next, the camera determines whether or not an operation intended to terminate the file list view has been carried out (S211) and, if it is determined that such a list view termination operation has been carried out, clears the file list view screen (S212) and terminates the process.

Moreover, if in S211 it is determined that no termination operation has been carried out, the camera returns the process to step S203, determines once again whether or not an instruction to change the reference file has been issued (S203), and repeats the subsequent processing steps.

[Reference File List View Control]

Next, detailed explanations will be provided regarding the reference file list view control performed in S201 of FIG. 2.

Figure 3A:
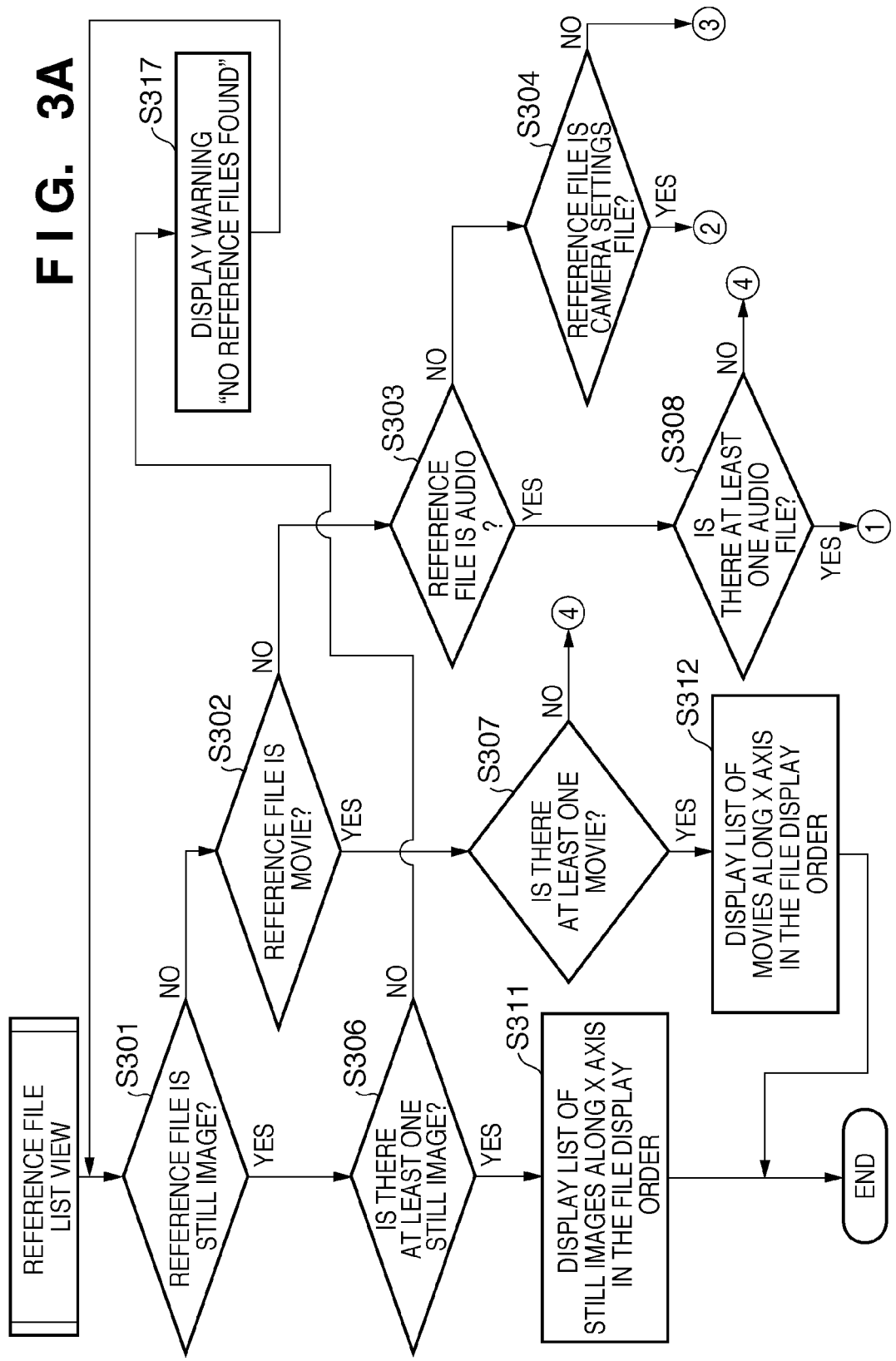
FIGS. 3A and 3B are flow charts illustrating reference file list view control in the first embodiment.
Figure 3B:
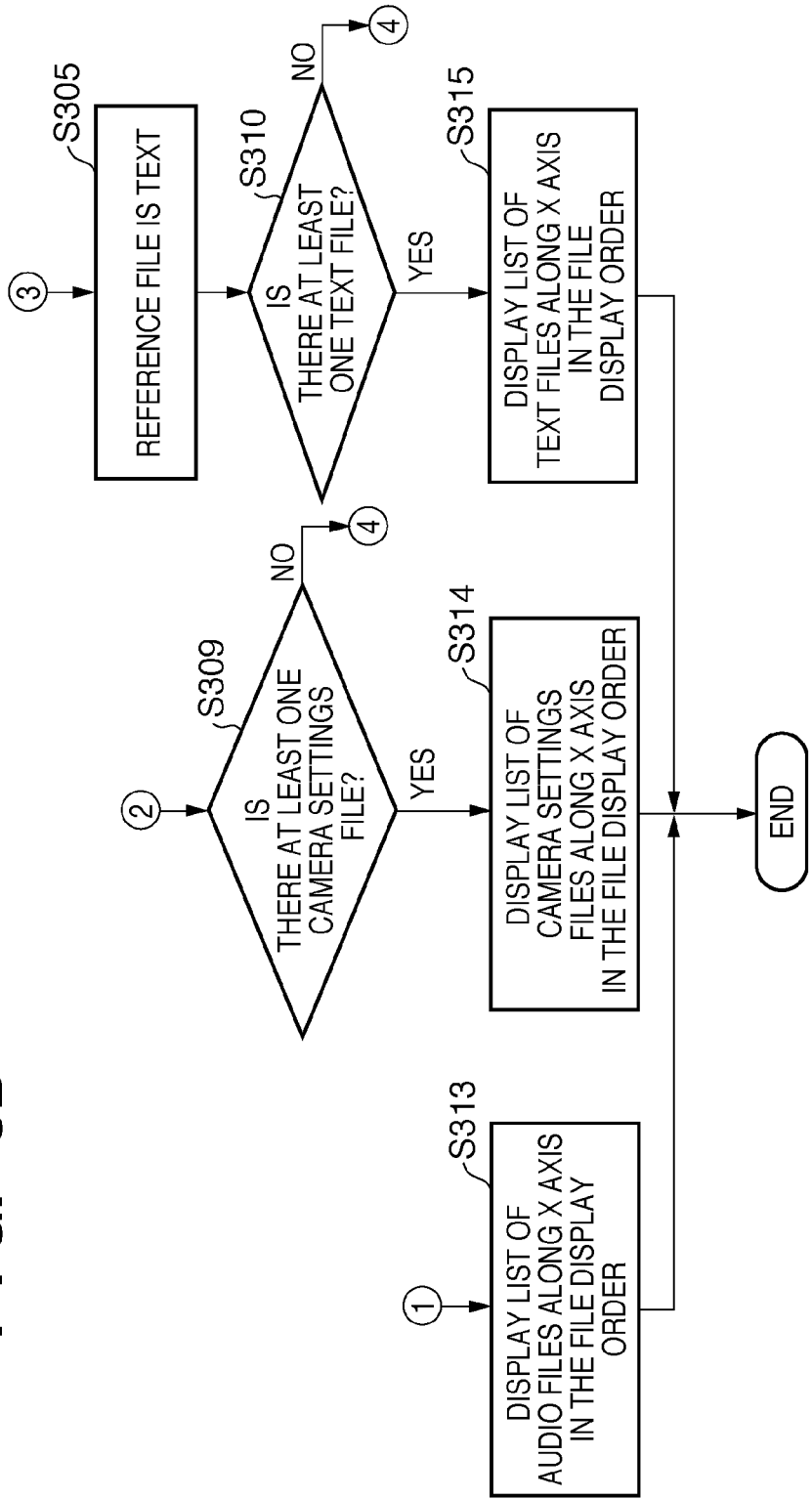

FIGS. 3A and 3B are flow charts illustrating the reference file list view control performed in S201 of FIG. 2.

In FIGS. 3A and 3B, the camera first performs reference file retrieval processing. Specifically, first of all, it determines whether or not the type of the designated reference file is "still image file" (S301). As described above, the type of the designated reference file is stored in the control memory 37.

If it is determined in S301 that the type of the reference file is "still image file", the camera searches the memory card 16 and hard disk 17 and determines whether or not there is at least one still image file to be displayed in the list view (S306). The file type is determined by referring to the extension of each file.

If it is determined in S306 that there is at least one still image file, the camera displays a list of the still image files retrieved in S306 in the reference file display area 901 in accordance with the designated display order (S311). If it is determined that there is not a single still image file, a warning 1101 is displayed as shown in FIG. 11A, which says "No Reference Files Found" (S317). Furthermore, an item, 1102, is displayed so as to prompt the user to perform a reference file changeover operation, which not only makes the user recognize the need for a reference file changeover, but also allows for switching the reference file in a simple manner.

If it is determined in S301 above that the type of the designated reference file is not "still image file", the camera determines whether or not the type of the reference file is "movie file" (S302).

If it is determined in S302 that the type of the reference file is "movie file", the camera searches the memory card 16 and hard disk 17 and determines whether or not there is at least one movie file to be displayed in the list view (S307).

If it is determined in S307 that there is at least one movie file, the camera displays a list of the movie files retrieved in S307 in the reference file display area 901 in accordance with the designated display order (S312). If it is determined that there is not a single movie, the process advances to S317.

If it is determined in S302 above that the type of the designated reference file is not "movie file", the camera determines whether or not the type of the reference file is "audio file" (S303).

If it is determined in S303 that the type of the reference file is "audio file", the camera searches the memory card 16 and hard disk 17 and determines whether or not there is at least one audio file to be displayed in the list view (S308).

If it is determined in S308 that there is at least one audio file, the camera displays a list of the audio files retrieved in S308 in the reference file display area 901 in accordance with the designated display order settings (S313). If it is determined that there is not a single audio file, the process advances to S317.

If it is determined in S303 above that the type of the designated reference file is not "audio file", the camera determines whether or not the type of the reference file is "camera settings file" (S304). It should be noted that a camera settings file is a file used for recording information regarding various settings, such as autofocus control, autoexposure control, automatic white balancing, etc.

If it is determined in S304 that the type of the reference file is "camera settings file", the camera searches the memory card 16 and hard disk 17 and determines whether or not there is at least one camera settings file to be displayed in the list view (S309).

If it is determined in S309 that there is at least one camera settings file, the camera displays in a list the group of camera settings files retrieved in S309 in the reference file display area 901 in accordance with the file display order settings (S314). If it is determined that there is not single camera settings file, the process advances to S317.

If it is determined in S304 that the type of the designated reference file is not "camera settings file", the camera determines whether or not the type of the reference file is "text file" (S305).

In S310, the camera searches the memory card 16 and hard disk 17 and determines whether or not there is at least one text file to be displayed in the list view. If it is determined in S310 that there is at least one text file, the text files retrieved in S310 are displayed in a list in the file display area 901 in accordance with the display order (S315). If it is determined that there is not a single text file, the process advances to S317.

[Associated File List View Control (FIG. 4)]

The associated file list view of S202 in FIG. 2 will be explained next.

FIG. 4 is a flow chart illustrating the associated file list view control performed in S202 of FIG. 2.

In FIG. 4, the camera first performs reference file determination. Specifically, first of all, the camera determines whether or not the type of the designated reference file is "still image file" (S401). If it is determined that the type of the reference file is "still image file", it displays a list of associated files associated with the still image file serving as a reference file (S406). This list view is described below.

If it is determined in S401 above that the reference file is not a "still image file", the camera determines whether or not the type of the designated reference file is "movie file" (S402). If it is determined that the reference file is a "movie file", it displays a list of associated files associated with the movie file serving as a reference file (S407). This list view is described below.

Subsequently, the camera proceeds in a similar manner by determining whether or not the type of the designated reference file is "audio file", "camera settings file", or "text file" (S403 to S405) and executes list view processing on the associated files corresponding to the determination results (S408 to S410).

[Associated File List View Control]

The associated file list view of S406 to S414 of FIG. 4 will be explained next. Here, the camera performs associated file retrieval processing and displays the retrieved associated files.

FIGS. 5 to 8 are flow charts illustrating list view control over associated files associated with various reference files in S406 to S410 of FIG. 4.

First of all, explanations will be provided regarding situations in which, as a result of the determination made in S401 of FIG. 4, it is found that the type of the reference file is "still image file". First, the camera determines whether or not the process has been executed on all the still image files (S501). Because the process has yet to be executed at the start of the flow chart, the determination is "No".

If it is determined in S501 above that the process has not been executed on all the still image files, the camera sequentially determines for each still image file whether or not there is a movie file that was in the process of being recorded when that still image was captured (S502). Here, the expression "being recorded" does not necessarily imply continuity of recording and includes cases, in which the recording of the movie may have been temporarily suspended for still image capture purposes.

It should be noted that an example of the method used to determine whether or not there is a movie file that was in the process of being recorded when a still image was captured consists in using information regarding the association between the still image files and movie files. For instance, when a still image is captured while a movie is being shot, the camera can associate the generated still image file with the movie file by writing the file path and other information used for mutual identification as attribute information. Moreover, the camera may associate the still image file and movie file and manage them by writing them to another file.

Furthermore, one method used to determine a movie file that was in the process of being recorded when a still image was captured consists in using the time/date stamps of the still image file and movie file. The attribute information of the still image file and movie file includes a stamp indicating the time/date when the still image was taken, as well as time/date stamps indicating when the movie started and time/date stamps indicating when it ended. Therefore, the file of the movie being recorded when a still image was captured can be identified by referring to the time/date stamp of the still image file and determining whether or not the movie was shot during a time period comprising the time/date of image capture. In addition, the camera may determine whether or not the movie was shot within a fixed period of time from the time/date of still image capture.

If it is determined in S502 above that there is a movie file that was in the process of being recorded when the still image was captured, the camera adds the file name of the movie file to the file list displayed in the list view (referred to as "list view list" below) (S503). It should be noted that when names are added to the list view list, the file name of the movie file and the file name of the corresponding still image are added together, in association with each other.

Subsequent to S503 above, or if it is determined in S502 above that there is no movie file that was in the process of being recorded when the still image was captured, the camera determines whether or not there is an audio file recorded when that still image was captured (S504). In such a case, just as in the case of movie files, determination can be made by referring to the association information or to the time/date of creation of the audio file.

If it is determined in S504 above that there is an audio file that was recorded when the still image was captured, the file name of the audio file is added to the list view list in association with the file name of the still image (S505).

Subsequent to S505 above, or if it is determined in S504 above that there is no audio file that was recorded when the still image was captured, the camera determines whether or not there is a text file or a camera settings file that was used in the capture of that still image (S506).

If it is determined in S506 above that there is a text file or camera settings file that was used in the capture of the still image, the file name of the text file or camera settings file is added to the list view list in association with the file name of the still image (S507).

Subsequent to S507 above, or if it is determined in S506 above that there is no text file or camera settings file used in the capture of the still image, the camera returns the process to S501. Then, again, a determination is made as to whether or not the process has been executed on all the still image files (S501) and the process is repeated for all the still image files.

On the other hand, if it is determined in S501 that the process has been executed on all the still images, the camera determines whether or not the list view list is empty or not (S508).

If it is determined in S508 above that the list view list is not empty, it means that there are associated files. Therefore, the camera displays a list of the associated files included in the list view list in the direction of the Y axis (S509). This process is described below.

Figure 11B:
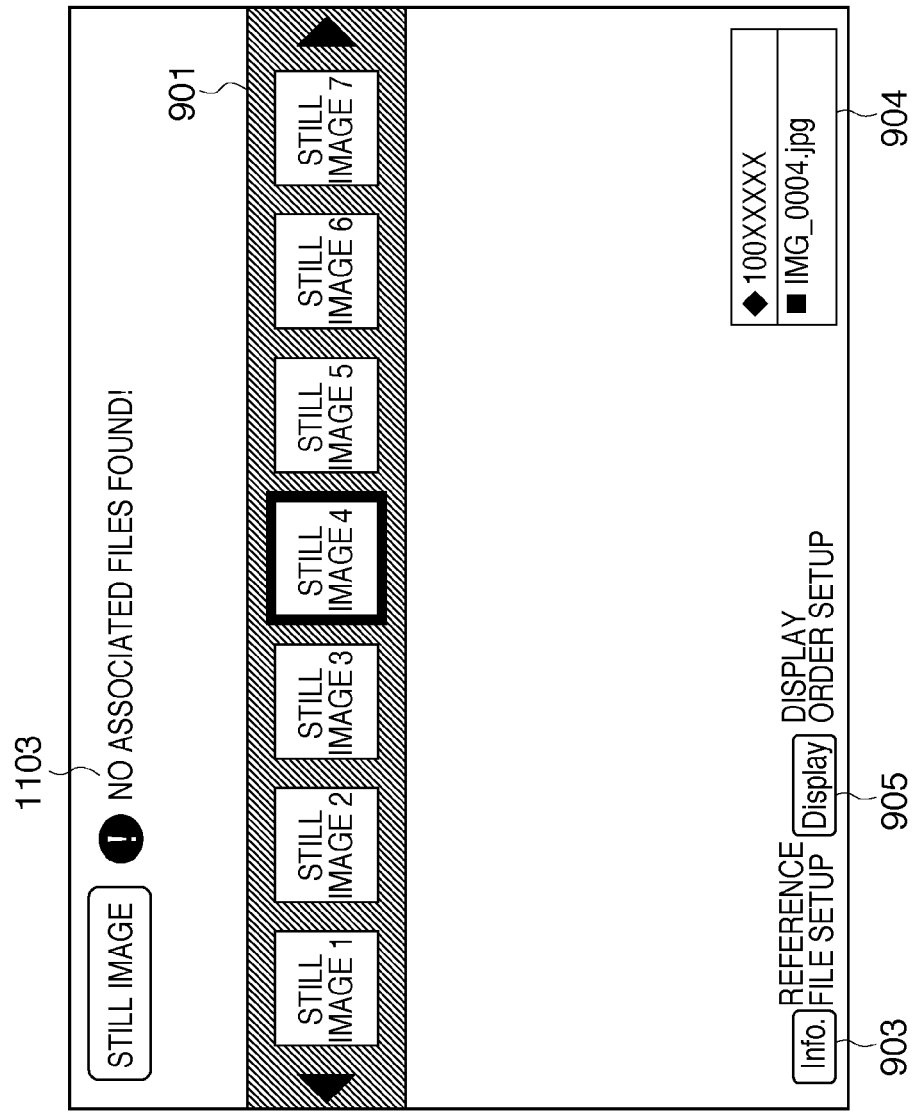
FIGS. 11A, B are diagrams illustrating warning screens used in the present embodiment.

Moreover, if it is determined in S508 above that the list view list is empty, then, as shown in FIG. 11B, a warning 1103 is displayed, which says that "No Associated Files Found" (S510). It should be noted that while FIG. 11B shows seven reference files, it is possible to display other reference files by carrying out an operation of forward scrolling of reference files. Here, the warning 1103 displayed in the present embodiment is displayed when there are no associated files not only for the seven reference file currently displayed, but for all the reference files. As a result, the user can easily realize that there are no associated files without checking all the reference files by performing forward reference file scrolling. Quite naturally, when there are no files associated with the reference file currently being displayed, the warning 1103 may be displayed as well.

Figure 6:
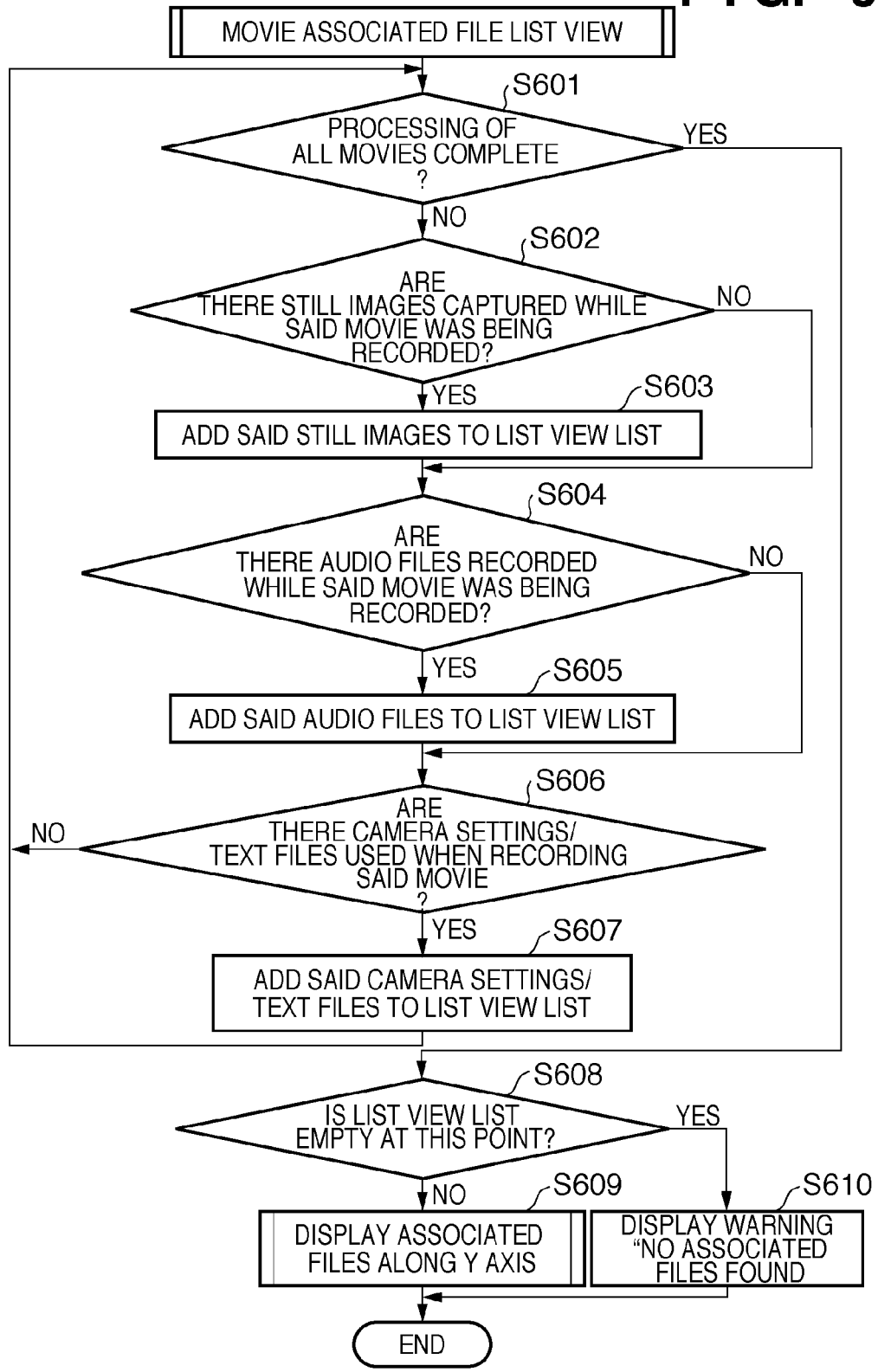
FIG. 6 is a flow chart illustrating associated file list view control in the first embodiment.

Next, explanations will be provided regarding situations wherein, as a result of the determination made in S402 of FIG. 4, it is found that the type of the reference file is "movie file". In FIG. 6, first of all, the camera determines whether or not the process has been executed on all the movie files (S601).

If it is determined in S601 above that the process has not been executed on all the movie files, the camera sequentially examines the movie files and determines for each one whether or not there is a still image captured when the movie was being recorded (S602). It should be noted that the method used to determine the association between the still image files and movie files is the same one used when the type of the reference file is "still image file".

If it is determined in S602 above that there is a still image captured when the movie was being recorded, the camera adds the file name of the still image to the list view list (S603). When there are multiple still images captured, multiple file names are added.

Subsequent to S603 above, or if it is determined in S602 above that there is no still image captured when the movie was being recorded, the camera determines whether or not there is an audio file recorded when the movie was being recorded (S604).

If it is determined in S604 above that there is audio file captured when the movie was being recorded, the camera adds the file name of the audio file to the list view list (S605).

Subsequent to S605 above, or if it is determined in S604 above that there is no audio file captured when the movie was being recorded, the camera determines whether or not there is a text file or camera settings file used in the recording of the movie (S606).

If it is determined in S606 above that there is a text file or camera settings file used when the movie was being recorded, the camera adds the file names of the text file and camera settings file to the list view list (S607).

Subsequent to S607 above, or if it is determined in S606 above that there is no such text file or camera settings file, the camera returns the process to S601. Then, again, a determination is made as to whether or not the process has been executed on all the movie files (S601) and the process is repeated for all the movie files.

On the other hand, if it is determined in S601 that the process has been executed on all the movies, the camera determines whether or not the list view list is empty or not (S608).

If it is determined in S608 above that the list view list is not empty, it means that there are associated files. Therefore, the camera displays a list of the associated files included in the list view list in the direction of the Y axis (S609).

Moreover, if it is determined in S608 above that the list view list is empty, then the warning shown in FIG. 11B is displayed (S610).

Figure 5:
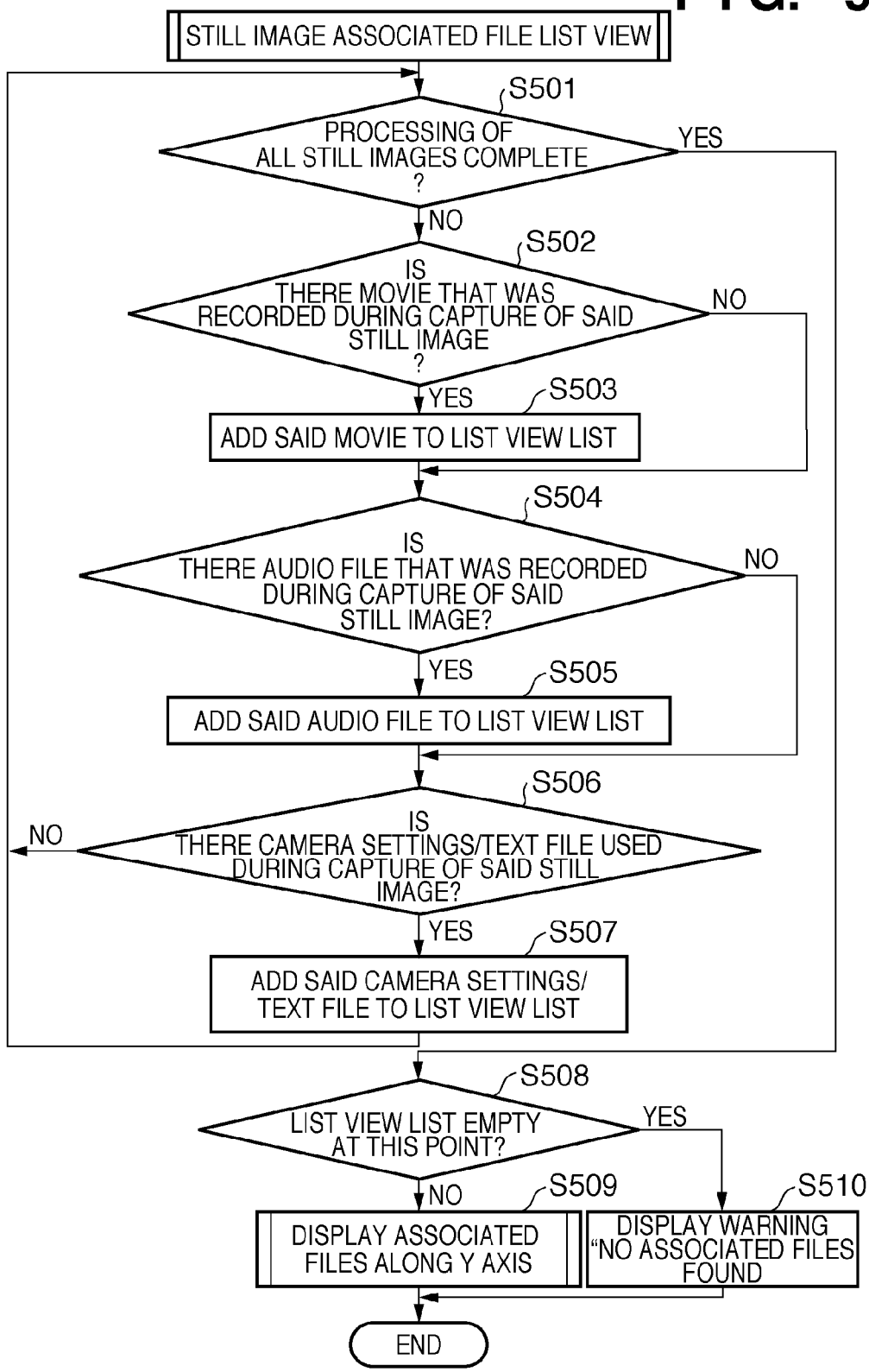
FIG. 5 is a flow chart illustrating associated file list view control in the first embodiment.

It should be noted that if in S403 to S405 the type of the reference file is found to be "audio file", "camera settings file", or "text file", the same process is carried out as in FIG. 5 and FIG. 6, and the corresponding explanations are therefore omitted.

[Associated File Display in Y-Axis Direction]

The display of associated files along the Y-axis in S509 of FIG. 5 and S609 of FIG. 6 will be explained next.

Figure 7A:
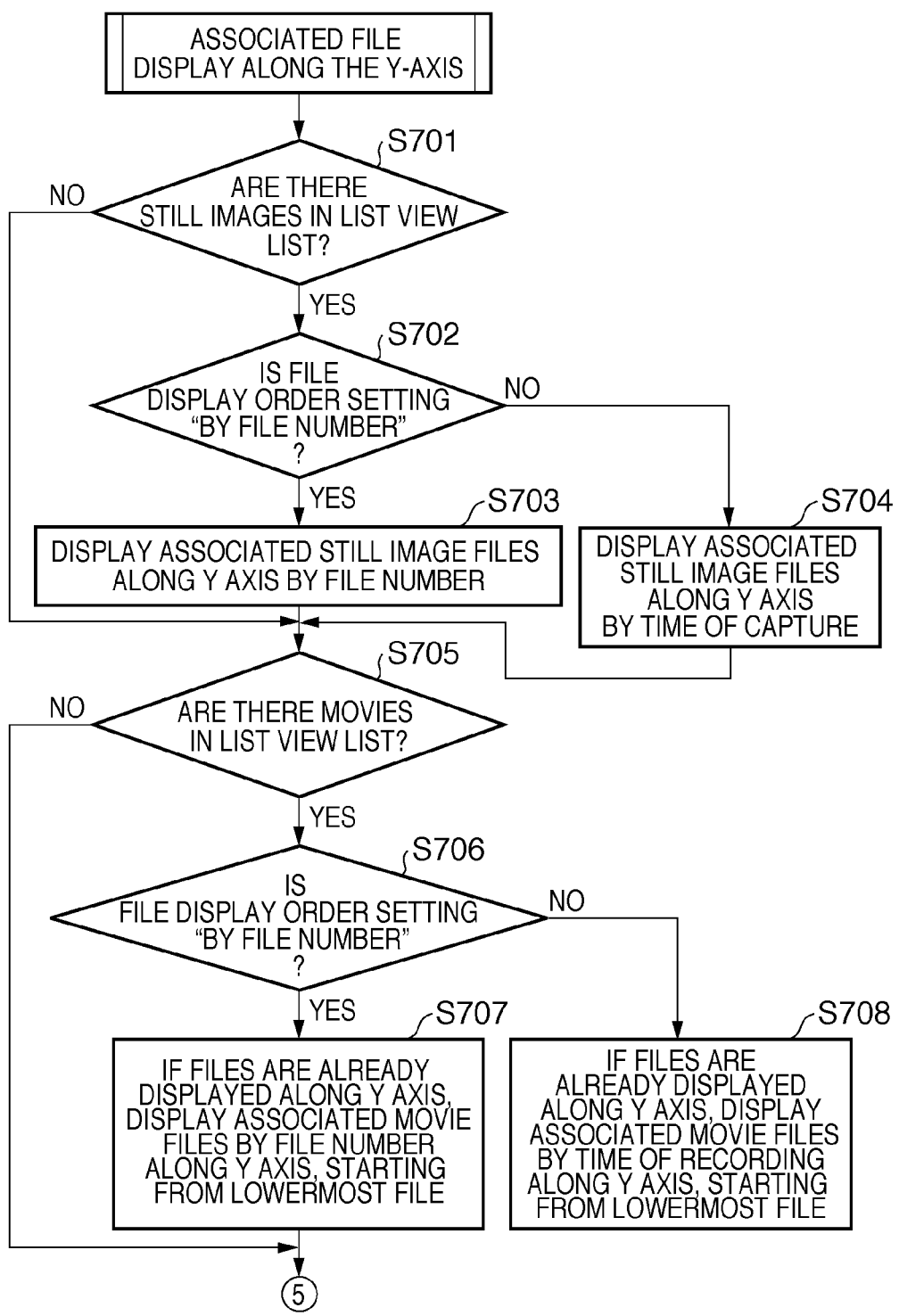
FIGS. 7A and 7B are flow charts illustrating control over associated file display along the Y-axis in S509 of FIG. 5 and S609 of FIG. 6.
Figure 7B:
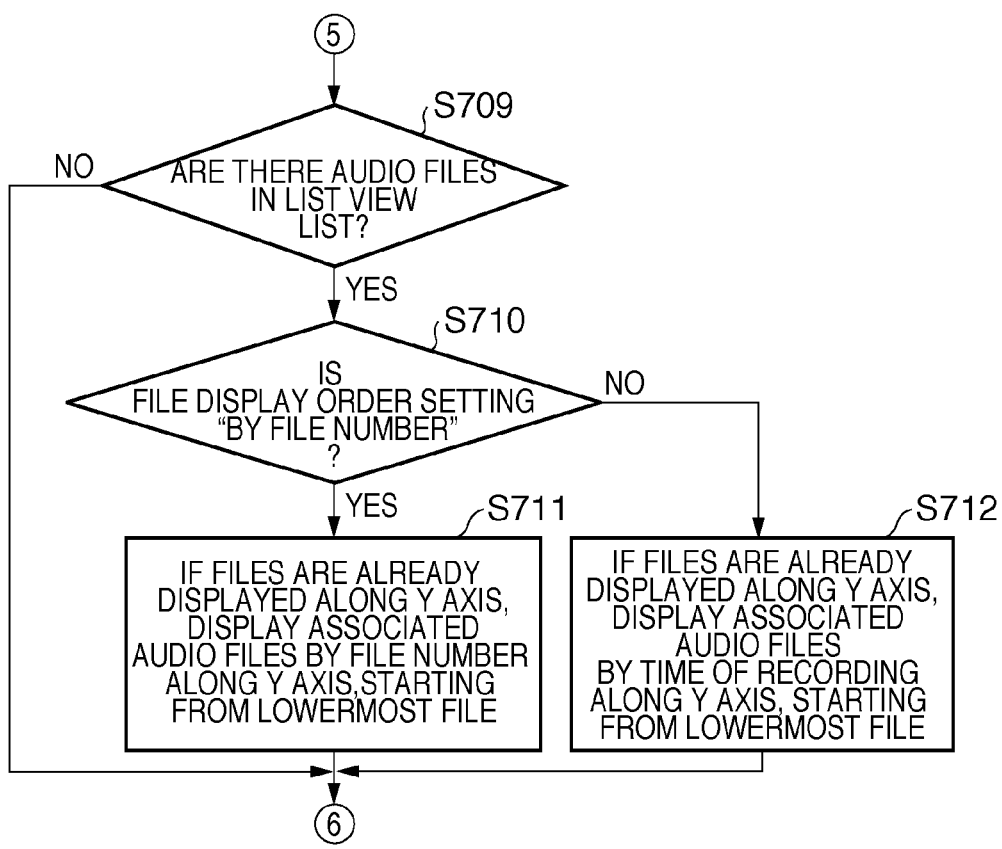
Figure 8:
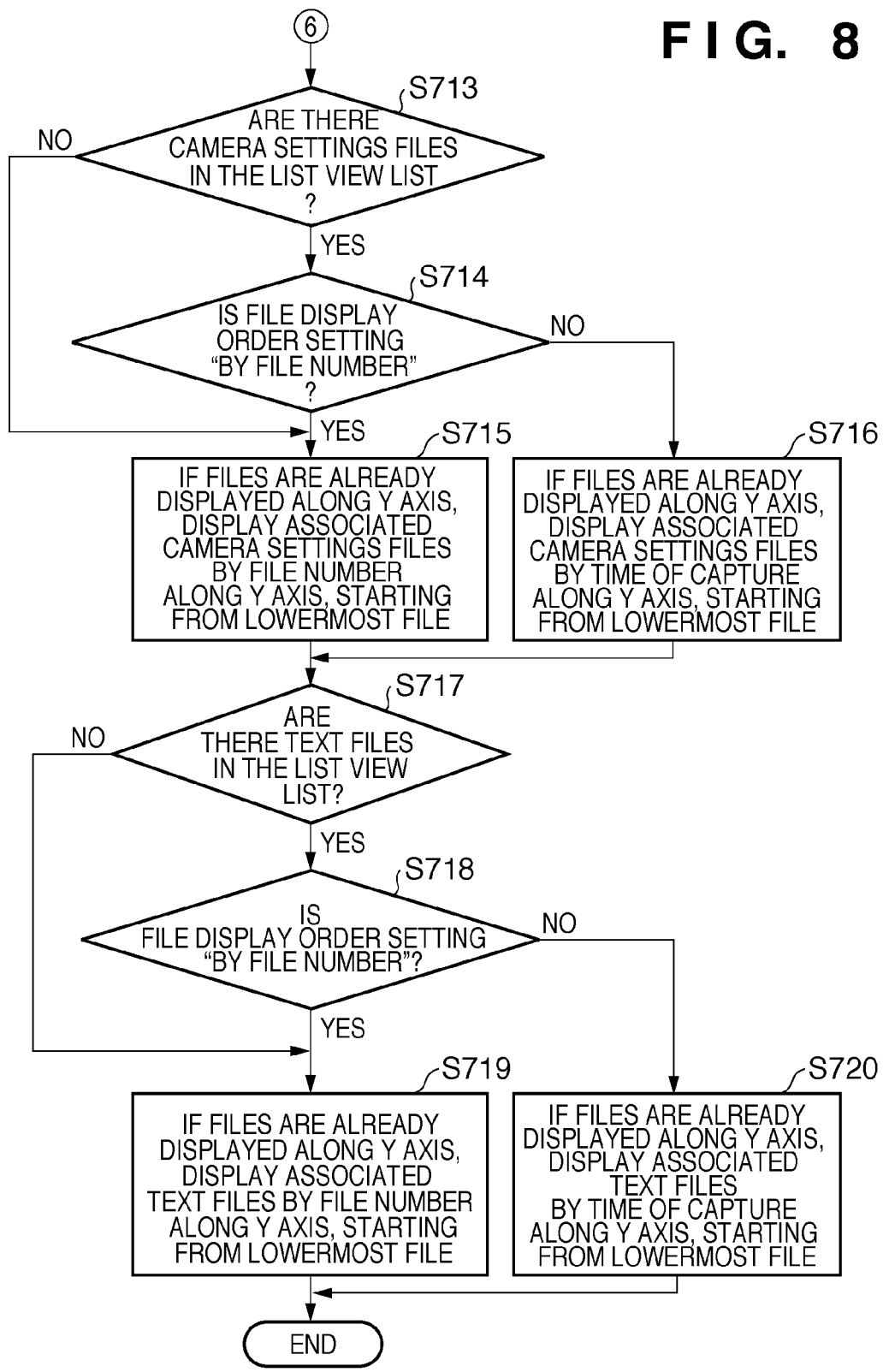
FIG. 8 is a flow chart illustrating control over associated file display along the Y-axis in S509 of FIG. 5 and S609 of FIG. 6.

FIGS. 7A to 8 are flow charts illustrating control over associated file display along the Y-axis in S509 of FIG. 5 and S609 of FIG. 6.

It should be noted that, unlike reference files, associated files are sometimes a mixture of numerous files of different types. Therefore, the files registered in the above-described list view list have to be retrieved based on the file type.

In FIGS. 7A and 7B, first of all, the camera determines whether or not still images are included in the above-described list view list (S701).

If it is determined in S701 above that still images are included, a determination is made as to whether the still image file display order setting is "by file number" or "by the time of capture" (S702).

Then, depending on the above-mentioned file display order setting determined in S702, the associated still image files are displayed as a list arranged in the direction of the Y axis by file number or by the time of capture (S703, S704). At such time, as described above, the associated files are displayed in the list view list along the same axis as the reference file, with which they are associated.

Subsequent to S703, 904 above, or if it is determined in S701 above that the list view list does not include still image files, the camera determines whether or not movie files are included in the list view list (S705).

If it is determined in S705 above that movie files are included, a determination is made as to whether the movie file display order setting is "by file number" or "by the time of capture" (S706).

Then, depending on the above-mentioned file display order setting, the associated movie files are displayed as a list arranged in the direction of the Y axis by file number or by the time of capture (S707, S708). Here, if there are files already arranged in the direction of the Y axis in the form of a list, the files are listed starting from its lowermost file.

Subsequent to S707, 708 above, or if it is determined in S705 above that the list view list does not include movie files, the camera determines whether or not audio files are included in the list view list (S709).

If it is determined in S709 above that audio files are included, a determination is made as to whether the audio file display order is "by file number" or "by the time of capture" (S710).

Then, depending on the above-mentioned file display order setting, the associated audio files are displayed as a list arranged by file number or by the time of capture (S711, S712). Here, if there are files already arranged in the direction of the Y axis in the form of a list, the files are listed starting from its lowermost file. For instance, in the example of FIG. 9, the movie files 909 and 910 are already displayed when the audio file 911 is displayed, and, as a result, the audio file 911 is displayed underneath the lowermost movie file 910.

Subsequent to S711, S712 above, or if it is determined in S709 above that the list view list does not include audio files, the camera subjects camera settings files and text files to the same processing and displays them in the direction of the Y axis (S713 to S720 in FIG. 8).

In the present embodiment, if there are multiple types of associated files present, the order of priority used for displaying the files is "still image files", "movie files", "audio files/settings files/text files", but the files do not necessarily have to be arranged in the above-mentioned order of priority. The order of priority may be varied and arrangements may be used, in which the order of priority is set by the user.

Figure 12:
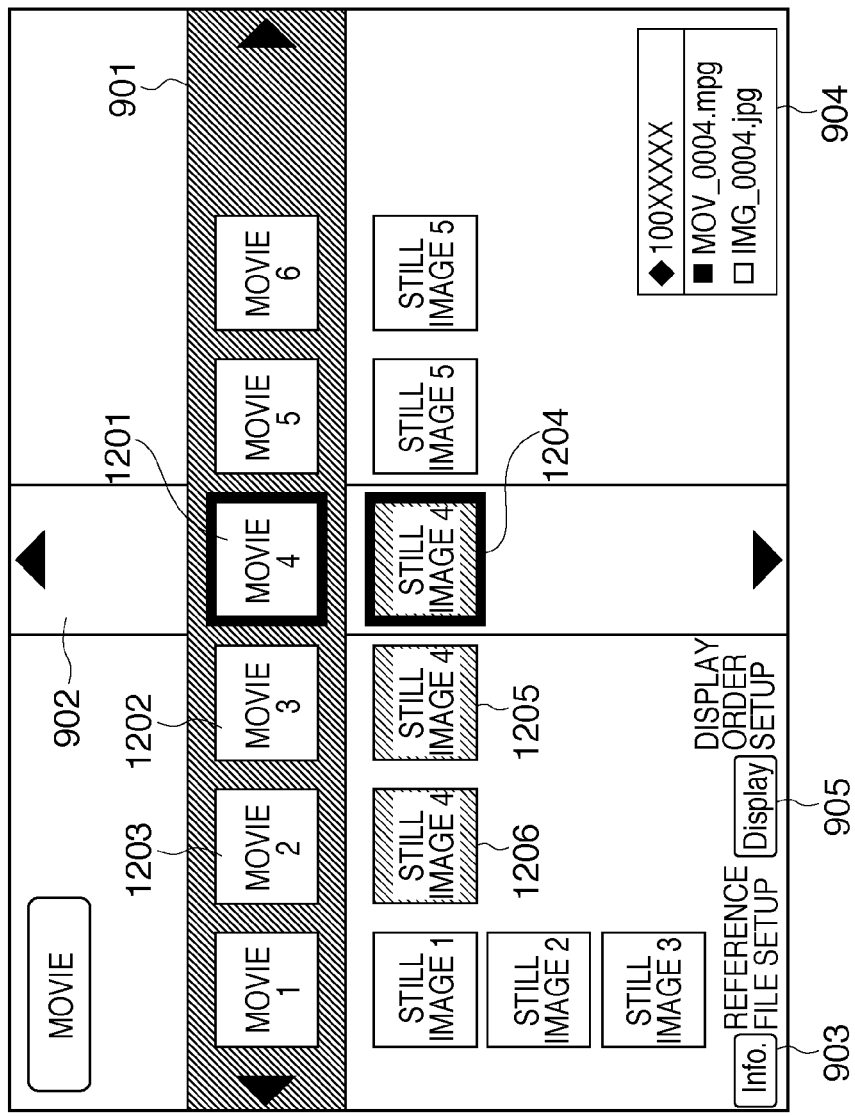
FIG. 12 is a diagram illustrating a file list view screen displayed when the type of the reference file used in the present embodiment is "movie".

Furthermore, when a predetermined associated file has been selected and an identical associated file belongs to another reference file as well, both the selected associated file and the identical associated file may be displayed in a manner permitting differentiation from the rest of the files. An exemplary display screen displayed in such a case is illustrated in FIG. 12. As shown in FIG. 12, "Still Image 4" (1204) is displayed as a file associated with a movie file 1201 in the direction of the Y-axis. At the same time, a "Still Image 4" is also associated with a movie file 1202 and movie file 1203. In this case, all the files named "Still Images 4" (1205, 1206) are displayed so as to permit differentiation from other associated files. For example, the display mode of the associated files is changed by changing the colors used to display them, by attaching icons, or adding special borders, etc. As a result, the user can see that there are multiple identical associated files belonging to other reference files.

Moreover, although in the present embodiment reference files were displayed in the direction of the X axis and associated files were displayed in direction of the Y axis, reference files may be displayed in the direction of the Y axis and associated files may be displayed in direction of the X axis.

In accordance with the present embodiment, the user can readily recognize associations between reference files and associated files due to the fact that a large number of various files are classified in accordance with predetermined associations and both predetermined reference files and associated files associated therewith are simultaneously displayed in list form.

Moreover, the present invention is not limited to the case in which files stored in the memory card 16 and hard disk 17 are displayed. For instance, a case may be contemplated, in which there are multiple devices that store files on a network and files belonging to the respective devices are displayed together in list form. In such cases, the present invention is applicable because file associations can be determined from the time/date stamps of capture or the like contained in the files.

[Other Embodiments]

The object of the present invention can be achieved by providing a system or apparatus with storage media storing the program code of software that implements the functionality of the above-described embodiments. Specifically, it is achieved by the computer (CPU or MPU) of the apparatus or system reading and executing the program code stored on the storage media.

In such a case, the program code read from the storage media will implement the functionality of the above-described embodiments and therefore the storage media, on which the program code is stored, will constitute part of the present invention.

Flexible disks, hard disks, optical disks, magneto-optical disks, CD-ROMs, CD-Rs, magnetic tape, nonvolatile semiconductor memory cards, ROM, etc. can be utilized as the storage media used to supply the program code. Moreover, the functionality of the above-described embodiments may be implemented by a computer reading and executing the program code.

However, needless to say, the invention also includes cases, in which the functionality of the above-described embodiments is implemented when an OS (operating system) etc. running on a computer partially or entirely carries out actual processing based on the instructions of the program code.

Furthermore, there may be cases, in which the program code read from the storage media is written to a memory provided on a function expansion board inserted in the computer or a function expansion unit connected to the computer. It goes without saying that the invention also includes cases, in which a CPU, etc. provided in the function expansion board or function expansion unit partially or entirely executes actual processing in accordance with instructions of the program code and the functionality of the above-described embodiments is implemented by the processing it performs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-046899, filed Feb. 27, 2008, which is hereby incorporated by reference herein in its entirety.

What is claimed is:

1. A display control apparatus for displaying images of a plurality of files containing at least image files of images captured by a digital camera as a list on a display unit, the apparatus comprising:

a setup unit adapted to set a specific file type among a plurality of file types as a reference file type, wherein the setup unit sets, as the specific file type, at least one type of file from still image file, movie file, audio file, and settings file used during capture of the still image of a still image file;

a reference file retrieval unit adapted to retrieve files of the type set by the setup unit from among the plurality of files as the reference files;

an associated file retrieval unit adapted to retrieve, from among the plurality of files, first associated files having a predetermined association with a first reference file which is one of the reference files retrieved by the reference file retrieval unit and second associated files having a predetermined association with a second reference file which is one of the reference files retrieved by the reference file retrieval unit; and a control unit adapted to control the display unit such that, along with displaying a list of the images of a plurality of reference files including the first reference file and the second reference file of the same file type retrieved by the reference file retrieval unit arranged in a first direction alone a first axis of a two-dimensional plane, the images of the first associated files of a different file type are displayed as a list arranged in a second direction along a second axis of the two-dimensional plane and intersecting with the arrangement oriented in the first direction at the location of the image of the first reference file, the images of the second associated files are displayed as a list arranged in the second direction at the location of the image of the second reference file, wherein, if the setting of the reference file type is changed by the setup unit, the reference file retrieval unit retrieves reference files based on the file type changed by the setup unit and the associated file retrieval unit retrieves an associated file associated with said reference files again, and the control unit controls the display unit so as to update the list view of the image of the reference files and an image of the associated files, and wherein in a case that a first file type is set as the reference file type and a file of a second file type is displayed as the associated file, if the setting of the reference file type is changed from the first file type to the second file type, said associated file retrieval unit may retrieve the file of the first file type which has been set to the reference file type as the associated file and said control unit controls the display unit to display the file of the first file type retrieved as the associated file and displayed along the second axis of the two-dimensional plane.

2. The apparatus according to claim 1, wherein the associated file retrieval unit retrieves, as the associated file, another file recorded simultaneously with recording the reference file.

3. The apparatus according to claim 2, wherein the associated file retrieval unit retrieves another file recorded simultaneously with recording the reference file based on information on the time of recording of said reference file.

4. The apparatus according to claim 2, wherein the associated file retrieval unit retrieves another file recorded simultaneously with recording the reference file based on association information that is contained as attribute information in the reference file and describes the association between said reference file and another file.

5. The apparatus according to claim 2, wherein, if the reference file is a still image file, the associated file retrieval unit retrieves, as an associated file, a movie file that was in the process of being recorded when said still image was captured.

6. The apparatus according to claim 2, wherein, if the reference file is a movie file, the associated file retrieval unit retrieves, as an associated file, a still image file that was captured when said movie was in the process of being recorded.

7. The apparatus according to claim 2, wherein, if the reference file is an audio file, the associated file retrieval unit retrieves, as an associated file, a still image file or a movie file that was in the process of being captured or recorded when said audio was recorded.

8. The apparatus according to claim 1, wherein the first direction and second direction are mutually orthogonal directions.

9. The apparatus according to claim 8, wherein the first direction is the horizontal direction of the display unit and the second direction is the vertical direction of the display unit.

10. The apparatus according to claim 8, wherein the first direction is the vertical direction of the display unit and the second direction is the horizontal direction of the display unit.

11. The apparatus according to claim 1, wherein, in case of presence, among the displayed images of the associated files, of an image of a file identical to the image of another displayed associated file, the control unit controls the display unit so as to display, in a discernible manner, the fact that the image of said associated file and the image of said another associated file are images of identical files.

12. The apparatus according to claim 1, further comprising operation units arranged in a first direction and a second direction orthogonal to the first direction, wherein the control unit, in response to manipulation of the operation unit arranged in the first direction, determines which reference file is to be put in a selected state among the plurality of reference files.

13. The apparatus according to claim 12, wherein the control unit, in response to manipulation of the operation unit arranged in the second direction, determines which associated file is to be put in a selected state among the plurality of associated files.

14. An imaging apparatus having an image sensing unit and displaying images of a plurality of files containing at least image files of images captured by the image sensing unit as a list on a display unit, the apparatus comprising:

a setup unit adapted to set a specific file type among a plurality of file types as a reference file type, wherein the setup unit sets, as the specific file type, at least one type of file from still image file, movie file, audio file, and settings file used during capture of the still image of a still image file;

a reference file retrieval unit adapted to retrieve files of the type set by the setup unit from among the plurality of files as the reference files;

an associated file retrieval unit adapted to retrieve, from among the plurality of files, first associated files having a predetermined association with a first reference file which is one of the reference files retrieved by the reference file retrieval unit and second associated files having a predetermined association with a second reference file which is one of the reference files retrieved by the reference file retrieval unit; and a control unit adapted to control the display unit such that, along with displaying a list of the images of a plurality of reference files including the first reference file and the second reference file of the same file type retrieved by the reference file retrieval unit arranged in a first direction along a first axis of a two-dimensional plane, the images of the first associated files of a different file type are displayed as a list arranged in a second direction along a second axis of the two-dimensional plane and intersecting with the arrangement oriented in the first direction at the location of the image of the first reference file, the images of the second associated files are displayed as a list arranged in the second direction at the location of the image of the second reference file, wherein, if the setting of the reference file type is changed by the setup unit, the reference file retrieval unit retrieves reference file files based on the file type changed by the setup unit and the associated file retrieval unit retrieves an associated file associated with said reference files again, and the control unit controls the display unit so as to update the list view of the image of the reference files and an image of the associated files, and wherein in a case that a first file type is set as the reference file type and a file of a second file type is displayed as the associated file, if the setting of the reference file type is changed from the first file type to the second file type, said associated file retrieval unit retrieves the file of the first file type which has been set to the reference file type as the associated file and said control unit controls the display unit to display the file of the first file type retrieved as the associated file and displayed along the second axis of the two-dimensional plane.

15. A display control method for displaying images of a plurality of files containing at least image files of images captured by a digital camera as a list on a display unit, the method comprising the steps of:

setting a specific file type among a plurality of file types as a reference file type, wherein the setting sets, as the specific file type, at least one type of file from still image file, movie file, audio file, and settings file used during capture of the still image of a still image file;

retrieving files of the type set by the setup unit from among the plurality of files as the reference files;

retrieving, from among the plurality of files, first associated files having a predetermined association with a first reference file which is one of the reference files retrieved by the reference file retrieval unit and second associated files having a predetermined association with a second reference file which is one of the reference files retrieved by the reference file retrieval unit; and controlling the display unit such that, along with displaying a list of the images of a plurality of reference files including the first reference file and the second reference file of the same file type retrieved by the reference file retrieval unit arranged in a first direction along a first axis of a two-dimensional plane, the images of the first associated files of a different file type are displayed as a list arranged in a second direction along a second axis of the two-dimensional plane and intersecting with the arrangement oriented in the first direction at the location of the image of the first reference file, the images of the second associated files are displayed as a list arranged in the second direction at the location of the image of the second reference file, wherein, if the setting of the reference file type is changed, reference files are retrieved based on the file type changed and an associated file is associated with said reference files again, and the display unit is controlled so as to update the list view of the image of the reference files and an image of the associated files, and wherein in a case that a first file type is set as the reference file type and a file of a second file type is displayed as the associated file, if the setting of the reference file type is changed from the first file type to the second file type, the file of the first file type which has been set to the reference file type is retrieved as the associated file and the display unit is controlled so as to display the file of the first file type retrieved as the associated file and displayed alone the second axis of the two-dimensional plane.

16. A computer-readable storage medium, which stores a software program that causes a computer execute the display control method according to claim 15.

\* \* \* \* \*